United States Patent [19]

Beigang et al.

[11] Patent Number: 4,713,040
[45] Date of Patent: Dec. 15, 1987

[54] TORQUE TRANSMISSION ASSEMBLY WITH ENHANCED TORQUE TRANSMITTING CHARACTERISTICS

[75] Inventors: Wolfgang Beigang; Werner Hoffman, both of Siegburg, Fed. Rep. of Germany

[73] Assignee: Uni-Cardan Aktiengesellschaft

[21] Appl. No.: 922,039

[22] Filed: Oct. 20, 1986

[30] Foreign Application Priority Data

Nov. 7, 1985 [DE] Fed. Rep. of Germany ....... 3539447

[51] Int. Cl.$^4$ .............................................. F16D 3/40
[52] U.S. Cl. ................... 464/132; 464/181; 464/183
[58] Field of Search ............. 464/128, 132, 134, 136, 464/181, 182, 183

[56] References Cited

U.S. PATENT DOCUMENTS 1,997,488  4/1935  Henry ............................. 464/132 X
4,568,314  2/1986  Krude ................................. 464/181

FOREIGN PATENT DOCUMENTS 0019585  11/1980  European Pat. Off. ............ 464/181
54937     6/1982   European Pat. Off. ............ 464/181
2818167   11/1978  Fed. Rep. of Germany .
54-65242  5/1979   Japan .................................. 464/181

Primary Examiner—Daniel P. Stodola
Attorney, Agent, or Firm—Toren, McGeady & Associates

[57] ABSTRACT

A power transmitting shaft for a torque transmission assembly is formed with a tubular cross section having bores arranged radially in the tube wall at at least one tube end and with bushes inserted into the bores. The bushes are provided with recesses for receiving joint journals or the like whose longitudinal axis is arranged radially in the tube for the purpose of introducing a torque, with tangential and radial forces occurring at the transmitting face of the tube wall. The bushes are designed as a truncated cone which is tapered towards the tube interior and with a cone angle $\alpha$ selected to be such that the radial component of the forces to be transmitted at the transmitting face is minimized or eliminated.

8 Claims, 11 Drawing Figures

TORQUE TRANSMISSION ASSEMBLY WITH ENHANCED TORQUE TRANSMITTING CHARACTERISTICS

The present invention relates to a torque transmitting shaft assembly including a shaft member having a tubular cross section with bores radially arranged in the tube wall at at least one tube end and with bushes inserted into the bores. The bushes are provided with recesses for receiving joint journals or the like, whose longitudinal axis is arranged radially in the tube for the purpose of introducing torque, with tangential and radial forces occurring at the transmitting face of the tube wall.

Force transmitting shafts, especially for the purpose of transmitting torque are widely known in motor vehicle engineering, e.g., for transmitting torque from the engine to the differential by cardan shafts. Recently, it has been attempted, for cost and weight saving purposes, to manufacture the tubular transmitting shafts, not from steel, but from fiber-reinforced plastics, especially carbon fiber-reinforced duroplastic materials. However, because of the relatively low transverse tensile strength and shear strength and the low modulus of elasticity of the plastic tubes, there are problems with respect to achievement of a sufficiently high load-bearing capacity of the transmitting shafts in the region of force introduction. This is the reason why it has been attempted, as described in DE-OS No. 28 18 167, for example, to increase the wall thickness of the plastic tube by increasing the outer diameter in the region of the introduction of force in order to achieve the necessary strength and load-bearing capacity.

In the case of the force transmitting shaft of the prior art, as described in EP-OS No. 00 19 585 and made of fiber-reinforced duroplastic materials, the tube end serving to introduce force is reinforced and, in addition, its outside is reinforced by a metal sleeve. The methods described in the two publications cited above, in order to achieve the required strength values of force transmitting shafts made of fiber-reinforced plastics, involve economically expensive production techniques which, furthermore, increase the space required to accommodate the increased outer diameter of the force transmitting shaft.

SUMMARY OF THE INVENTION

The present invention is directed toward providing a force transmitting shaft for a torque transmission assembly which will display enhanced characteristics with regard to the introduction of forces comprising a radial and tangential component so that it may be possible to use tubes made of materials with lower strength values. In particular, the invention seeks to provide a structure which will prevent any deformation of the tube cross section of the force transmitting shaft due to the transmission of torque.

The present invention utilizes a bush designed as a truncated cone which is tapered towards the tube interior and whose cone angle $\alpha$ is selected to be such that the radial component of the forces to be transmitted is minimized or eliminated.

The invention is based on the knowledge that when torque is transmitted from a propeller shaft to the tube, especially with the different material properties, such as the different moduli of elasticity of a fiber-reinforced plastic tube and a metallic joint, the tube deforms or may deform under the influence of the radial force component of the torque. In the case of a two-armed joint, the circular cross section of the tube becomes elliptical, whereas in the case of a tripode star, a polygonal deformation occurs which may reach a stage where the joint falls out of the bush.

Until now, it has always been attempted to prevent such deformation caused by radial forces by reinforcing the tube wall accordingly. The invention, however, is based on a reverse procedure in that a way is found to reduce the radial forces, in fact, it is possible to reduce the radial forces to zero. In accordance with the invention, this is achieved by designing the transmitting face as a truncated cone. Further, by selection of the right cone angle $\alpha$, it is possible to reduce the radial component of the forces occurring during the transmission of torque to zero. This cone angle $\alpha$ is always smaller than a cone angle $\alpha_o$ of a truncated cone whose imaginary cone point is in the center of the cross section of the tube. The cone angle $\alpha$ of the transmitting face is preferably obtained by using a conical bush, but it is also possible to integrate the transmitting face of the tube with the joint journal or journal end, which means that the journal has a conical design.

In accordance with the invention, the radial component of the force introduced from the joint into the tube may be reduced so that even with very thin tube walls and a low strength thereof, deformation of the tube cross section becomes avoidable. If the invention is applied to fiber-reinforced tubular force transmitting shafts, there is no need for the previously common reinforcement of the tube end where the force is introduced. If the bush, in accordance with the invention is used, a thickness a of the tube wall, for example, may remain constant along its length.

It is particularly advantageous to apply the invention to tubes, especially those made of fiber-reinforced plastics, such as carbon fiber and/or glass fiber and/or plastic fiber-reinforced plastics. In such cases, preference is given to duroplastic materials, but also to high-strength thermoplastic materials. The bush may be manufactured of steel, it may be provided with a continuous recess for receiving joint journals or it may have a dish-shaped design. In any case, by having a truncated cone in accordance with the invention, it is capable of minimizing or even eliminating the radial forces in favor of the tangential forces when transmitting torque.

In a further embodiment of the invention, the bore of the tube receiving the bush is provided with a conical annular face which corresponds to the truncated cone and whose conicity is determined by the cone angle $\alpha$ of the bush.

The invention can be applied particularly advantageously if the part into which the torque is introduced, i.e., the tubular shaft, has a lower modulus of elasticity, i.e., if it is more easily deformable than the force transmitting part, e.g., the steel bush.

By making use of the invention, the wall thicknesses of the tubular shaft may be smaller, as its radial load is reduced.

The cone angle $\alpha$ of the bush may be determined analytically, depending upon the outer diameter of the bush, i.e., on the bore diameter in the tube wall as well as on the outer diameter and the wall thickness of the tube. FIG. 8 shows the optimum cone angle $\alpha$ as a function of the ratio of the bore diameter or the outer diameter d of the bush to the tube diameter D in accordance with the invention, with the mean diameter measured in the center of the wall thickness of the tube being used as a basis. The curve in FIG. 8 shows the cone angle α for the respective ratio of the diameters mentioned in the case of which the radial component of the forces occurring is eliminated during the transmission of torque. If the cone angle α is slightly larger than the optimum angle given, there is again obtained a radial component directed towards the interior, i.e., the center of the tube. If the cone angle α is smaller than the optimum angle, there is again obtained a radial component which is directed towards the outside.

In a further embodiment of the invention, these findings are made use of. In accordance with the invention, it is proposed that following the tapered area of the truncated cone, the bush should comprise a cylindrical collar. By providing a cylindrical collar, there is deliberately created a radial component during the transmission of torque, which radial component is directed towards the outside, the advantage of this design being that by deliberately compressing the laminate layer, delamination of the tube is prevented since the radial components compress the layers in the application region of the bush, i.e., of the collar at the inner wall of the tube. The cone angle of the truncated cone of the bush may also be slightly larger than the optimum cone angle so that, in the course of transmission of torque in the outer region of the tube wall, there is obtained a radial component directed towards the inside. In this case, the cone angle can be calculated in such a way that the radial component occurring in the region of the truncated cone and directed towards the inside has the same magnitude as the radial component occurring in the region of the cylindrical collar and directed towards the outside so that the tube, as far as the radial forces are concerned, is essentially neutral towards the outside while, at the same time, the laminate layer is compressed in the direction of the inside.

The height h of the cylindrical collar of the bush may be determined as a function of the required magnitude of the radial force occurring in the region of the collar. Accordingly, the tube bore receiving the bush may have a cylindrical step corresponding to the cylindrical collar of the bush.

Depending on the force transmitting shaft, the bush itself may be inserted into the tube wall of the force transmitting shaft by using sealing means or glue, e.g., epoxy resins.

The ends of the joint journal could be fixed in the bushes by inserted Seeger rings or welding or cold-forming, for example.

The various features of novelty which characterize the invention are pointed out with particularity in the claims annexed to and forming a part of this disclosure. For a better understanding of the invention, its operating advantages and specific objectives attained by its use, reference should be had to the drawings and descriptive matter in which there are illustrated and described the preferred embodiments of the invention.

DETAILED DESCRIPTION OF THE PREFERRED EMBODIMENTS

Figure 1:
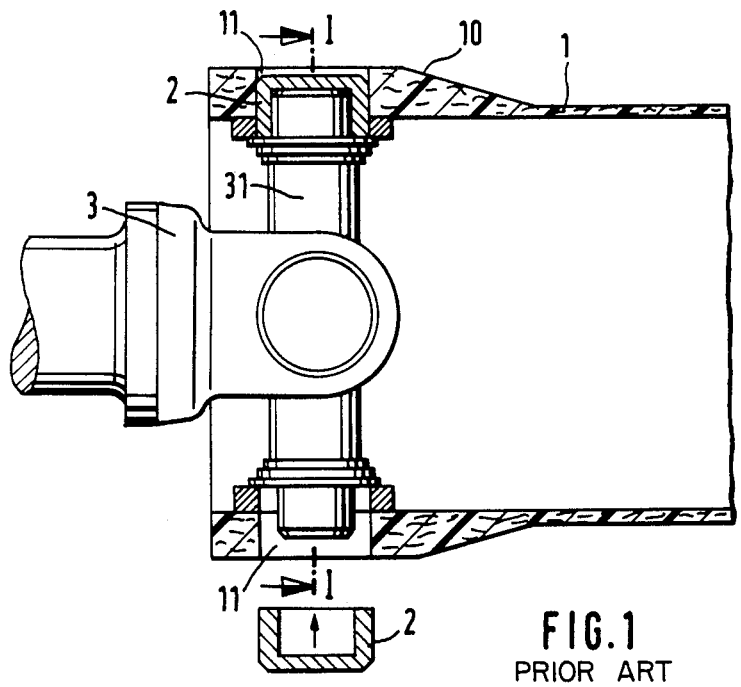
FIG. 1 is part of a longitudinal section through a force transmitting shaft having a joint with a cylindrical bush in accordance with the prior art.

Referring now to the drawings, FIG. 1 shows a torque transmitting assembly including a tubular force transmitting shaft or tube 1 of prior art design, in the case of which, the tube 1 is made of fiber-reinforced plastics and where in the region of a tube end 10, the wall thickness of the tube 1 is reinforced considerably to permit bores 11 to receive cylindrical bushes 2 for joint journals 31 of a joint 3. During assembly, the dish-shaped bushes 2 are positioned on the joint journal ends inserted into the bores 11 of the tube 1.

Figure 2:
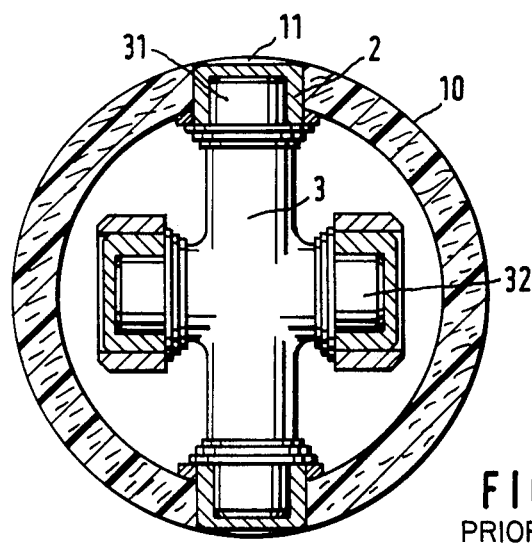
FIG. 2 is a cross section of FIG. 1 taken along the line I—I.

In FIG. 2, section I—I of FIG. 1 also shows the joint journals 32 of the crosspiece of the joint 3.

Figure 3:
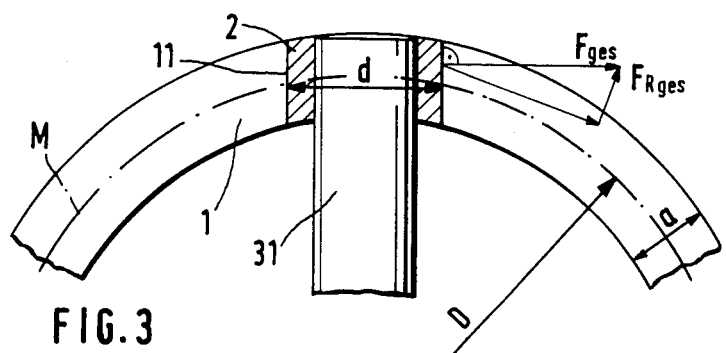
FIG. 3 is a diagrammatic partly vertical cross section through the tube of FIGS. 1 and 2 showing the force distribution.

FIG. 3 is a diagrammatic illustration of the distribution of forces in a force transmitting shaft according to FIG. 1. The tube 1 has a wall thickness a and a mean diameter D. Torque is introduced into the tube by the joint journal 31 through the bush 2 accommodated in the bore 11 of the tube. The bush 2 and the bore 11 have a diameter d measured in the center of the wall thickness of the tube 1. The above-mentioned values will be used in subsequent calculations. In this example, the transmitted forces $F_{ges}$ have a radial, outwardly directed component $F_{Rges}$ and a tangential component which is not described in detail.

Figure 4:
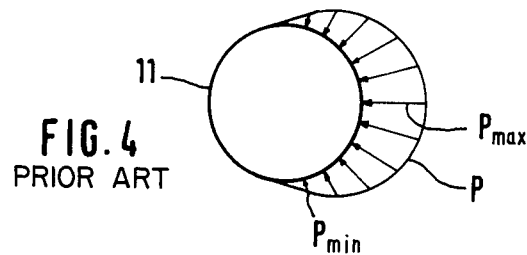
FIG. 4 is a schematic surface diagram of the distribution of force in the region where the force is introduced into the tube in accordance with FIG. 3.

FIG. 4 shows the distribution of pressure at the transmitting face of the bore 11 and of the cylindrical bush 2, this distribution indicating a maximum $P_{max}$ and two minima $P_{min}$. The force conditions are examined in the region of the central diameter D of the tube 1, i.e., in the center line M.

Figure 5:
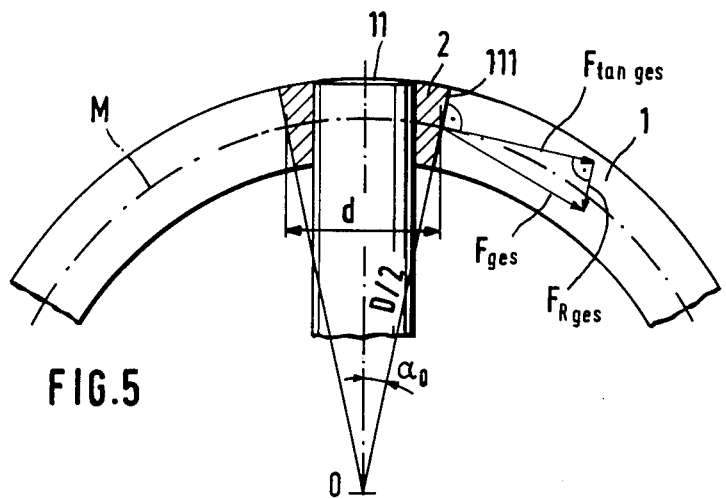
FIG. 5 is a cross section analogous to FIG. 3 with an inserted conical bush and also illustrates the distribution of forces.

For examining the force conditions in the tube according to FIG. 5, the cylindrical bearing bush 2 of FIG. 3 is replaced by a conical bush 2 whose conical faces are aligned with the radii D/2 of the tube 1, i.e., the imaginary cone point is in the center of the cross section of the tube. With such a conical bush where the cone angle α is formed by the two radii of the tube, the maximum force $F_{max}$ acting at $p=P_{max}$ has a tangential component only, i.e., $F_{Rmax}=0$ at $p=P_{max}$. However, when looking at the forces in their entirety, $F_{ges}$ has a radial component $F_{Rges}$ directed towards the tube interior.

The center of the cross section of the tube of the tubular shaft 1 has been given the reference symbol O.

Figure 6:
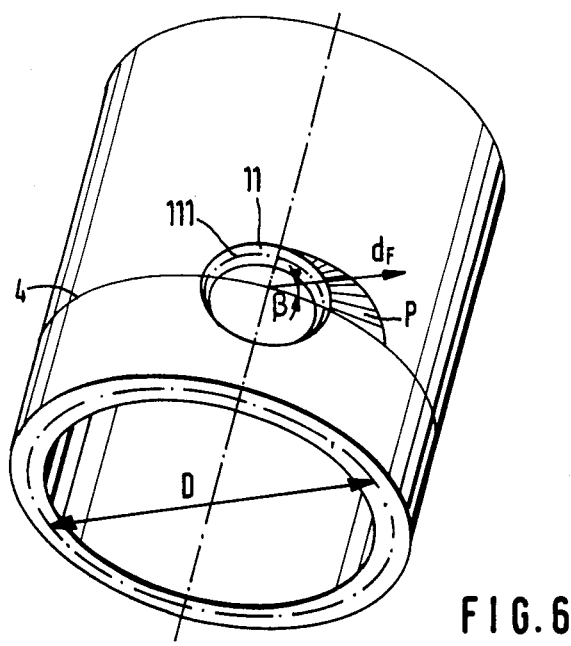
FIG. 6 is a perspective view of the tube with a conical transmitting face for a conical bush and a diagram of the distribution of forces.

FIG. 6 is a diagrammatic perspective plan view of the tube with the conical bore 11 for receiving the bush 2 according to FIG. 5. The force conditions have so far been looked at below the cylindrical section 4, as shown in FIG. 5. It was found that only at point $p = p_{max}$, i.e., with $\beta = 0$, assuming the realization of the cone angle $\alpha_o$, the radial component of the infinitesimal partial force dF equals 0.

In all other points, above the angle $\beta$, $0 < \beta < \pi/2$ at a cone angle $\alpha = \alpha_o$, with $\sin \alpha_o = d/D$ and the imaginary cone point being in the center of the cross section of the tube, there are infinitesimal radial partial force components $dF_F(\beta)$ which, when added up, result in an inwardly directed radial force.

The invention is based on the finding that between the two extreme cone angles $\alpha = 0$ and $\alpha = \alpha_o$, there is a cone angle which can be calculated and below which the resulting radial component in the transmitting face is zero.

This cone angle can be calculated by using the equation $$\int_{\beta=0}^{\beta=\frac{\pi}{2}} dF_R(\beta) \overset{!}{=} 0$$

Figure 8:
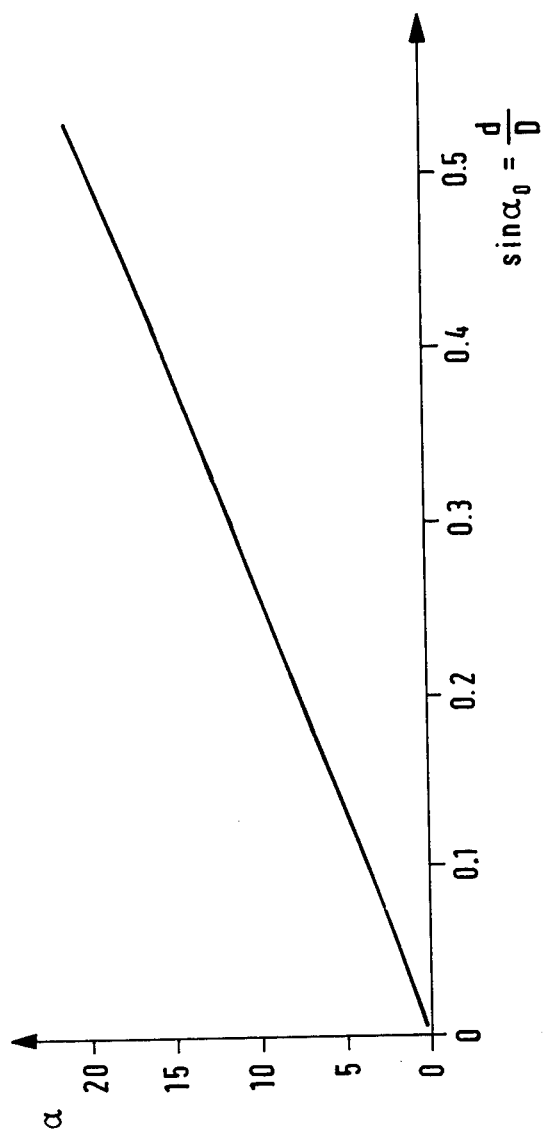
FIG. 8 is a graphic illustration of the cone angle α as a function of the tube diameter and the bush outer diameter.

FIG. 8 contains the calculation and graphic illustration of the values for the optimum angle $\alpha$ as a function of $\sin \alpha_o$, i.e., the ratio of the mean bush diameter d to the mean tube diameter D.

In realizing the invention, it is not absolutely essential to observe the optimum angle $\alpha$ for the truncated cone of the bush 2 and the corresponding conicity of the bore for receiving the bush 2 in the tube wall. Even if there are slight deviations from the optimum angle towards plus or minus, the radial forces occurring are reduced considerably, as compared to cylindrical bushes and even as compared to conical bushes as their cone angle corresponds to the angle $\alpha_o$ or greater.

By applying the teaching of the invention of designing conical bushes with a discrete cone angle, it is posssible to introduce the force during the transmission of torque while eliminating the radial forces in the tubular force transmitting shaft and, in consequence, it is possible to avoid deformation of the cross section of the tube which is particularly frequent with materials having a low modulus of elasticity, without there being any need to take additional measures for reinforcing or strengthening the tube wall or cross section.

Figure 7:
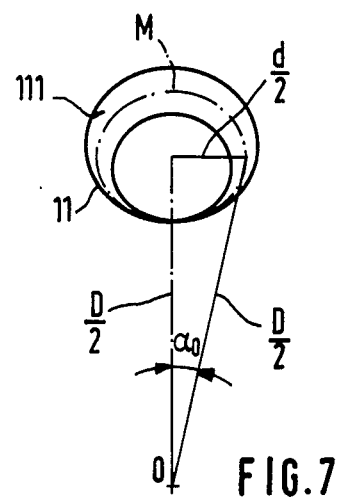
FIG. 7 is a partial view of the conical bore of FIG. 6.

FIG. 7 shows an additional way of illustrating the cone angle $\alpha_o$ of the cylindrical section to FIG. 6.

Figure 9:
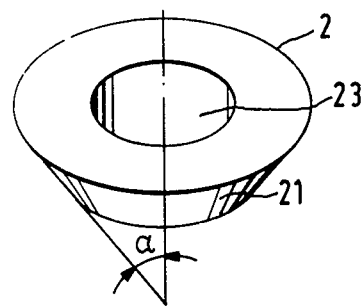
FIG. 9 is a perspective view of a conical bush.

FIG. 9 contains a diagrammatic illustration of a bush 2 which, in accordance with the invention, is designed as a truncated cone, which has been provided with a continuous cylindrical recess 23 for receiving the joint bolt and whose outer contour tapered at the cone angle $\alpha$ in the direction of the tube interior of the transmitting shaft is designed as a truncated cone 21.

Figure 10:
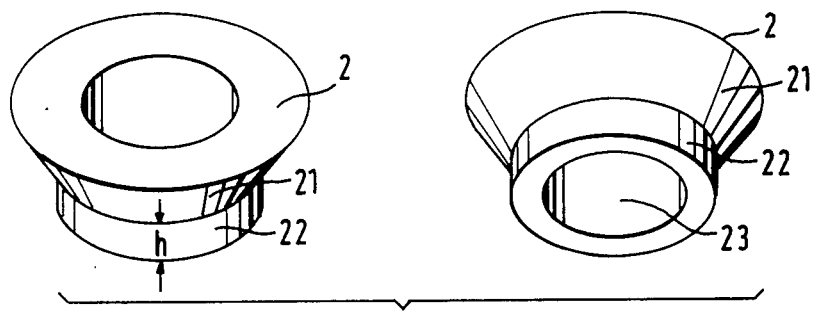
FIG. 10 shows two perspective views of a conical bush with a cylindrical collar.

In a further embodiment of the invention, it is possible, in addition to giving the bush 2 the design of a truncated cone, to provide it with a cylindrical collar 22, as illustrated in FIG. 10, with the cylindrical collar 22 adjoining the tapered region of the truncated cone 21 of the bush 2 with the height h.

The latter bush design in accordance with the invention permits a specific amount of compression of the laminate layers in the area of force introduction of fiber composite materials while, at the same time, compensating for the radial force components.

It is also possible to close the upper end of the bush or provide it with means for fixing the joint bolt.

Figure 11:
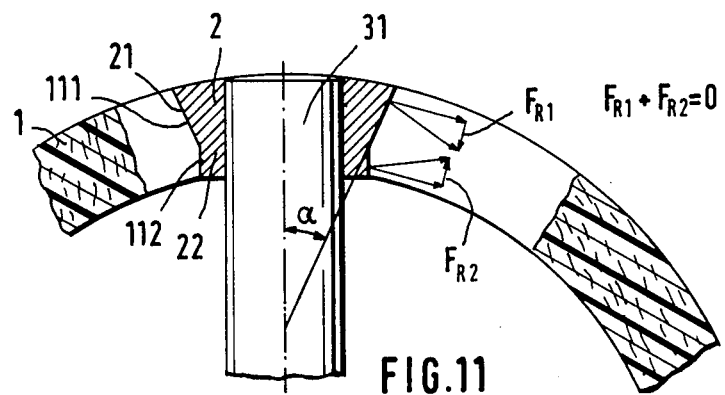
FIG. 11 is a diagrammatic view of the force conditions analogous to FIGS. 3 and 5, with the bush according to FIG. 10.

FIG. 11 contains a diagrammatic illustration of the force conditions in the cross section of the tube including the bush 2 designed in accordance with the invention and shown in FIG. 10. In corresponding to the truncated cone 21 of the bush 2, the bore 11 in the wall of the tube 1 has been provided with a conical annular face 111 and in corresponding to the cylindrical collar 22 of the bearing bush 2, the bore 11 has been given a cylindrical step 112.

The inclination of the truncated cone 21 is determined by the cone angle $\alpha$ in such a way that, in accordance with the invention, the equation $$\int_{\beta=0}^{\beta=\pi/2} dF_R(\beta) > 0$$

is used to calculate an inwardly directed force $F_{R1}$.

In the region of the cylindrical collar 22, there occur forces which, in addition to a tangential component, have an outwardly directed radial component $F_{R2}$. The radial components $F_{R2}$ and $F_{R1}$ effect the compression of the tube wall, thereby preventing delamination of the composite materials in the region of force introduction of the tube.

While specific embodiments of the invention have been shown and described in detail to illustrate the application of the inventive principles, it will be understood that the invention may be embodied otherwise without departing from such principles.

What is claimed is:

1. In a shaft assembly for transmitting torque including a fiber-reinforced composite shaft member having a tubular configuration with a tube wall having radial bores through at least one end thereof and bushes inserted into said bores, with said bushes being provided with recesses which may receive therein joint journals having a longitudinal axis arranged radially in said shaft member for the purpose of introducing torque, with tangential and radial forces occurring at a transmitting face of said tube wall, the improvement comprising that said bushes are formed as truncated cones tapered towards an interior of said shaft member with a cone angle $\alpha$ selected such that a radial component of forces to be transmitted is minimized or eliminated.

2. A shaft assembly according to claim 1, wherein said cone angle $\alpha$ of said truncated cone of said bushes is smaller than a cone angle $\alpha_o$ of a truncated cone having an imaginary cone point which is in the center of the cross section of said shaft member.

3. A shaft assembly according to claim 1, wherein said bushes comprise a cylindrical collar extending radially inwardly from said truncated cone.

4. A shaft assembly according to claim 3, wherein a height h of said cylindrical collar is determined as a function of the required magnitude of the radial force occurring in the region of the collar.

5. A shaft assembly according to claim 3, wherein said bores in said shaft member receiving said bushes are provided with a cylindrical step corresponding to said cylindrical collar.

6. A shaft assembly according to claim 1, wherein said bores of said shaft member receiving said bushes are provided with a conical annular face which corresponds to said truncated cones and whose conicity is determined by the cone angle α.

7. A shaft assembly according to claim 1, wherein said shaft member is manufactured from a duroplastic material consisting of at least one of carbon-fiber-reinforced plastic, glass-fiber-reinforced plastic and plastic fiber-reinforced plastic.

8. A shaft assembly according to claim 1, wherein said bushes are made of metal.

* * * * *